Figure 1:
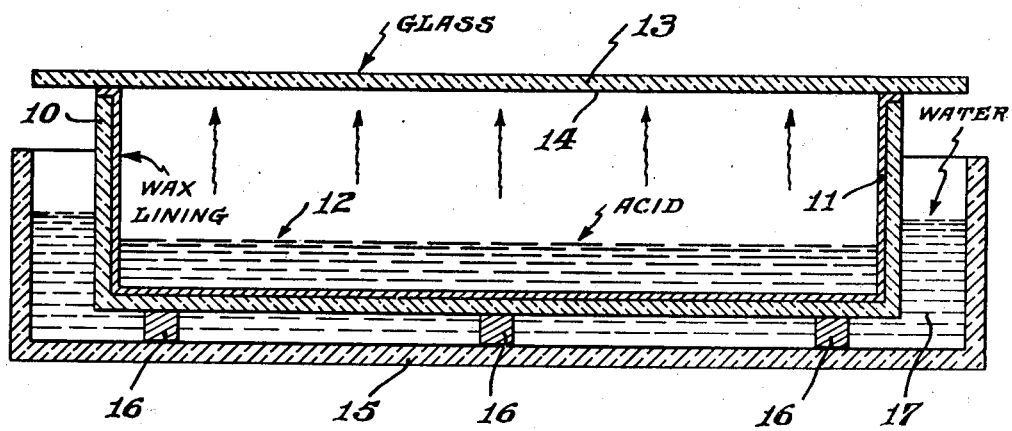

Feb. 15, 1949.  F. H. NICOLL  2,461,840
METHOD OF FORMING LOW-REFLECTING
SURFACES ON OPTICAL ELEMENTS
Filed Oct. 14, 1942  2 Sheets-Sheet 1

Inventor
Frederick H. Nicoll
By
Attorney

Feb. 15, 1949.  F. H. NICOLL  2,461,840
METHOD OF FORMING LOW-REFLECTING
SURFACES ON OPTICAL ELEMENTS
Filed Oct. 14, 1942  2 Sheets-Sheet 2
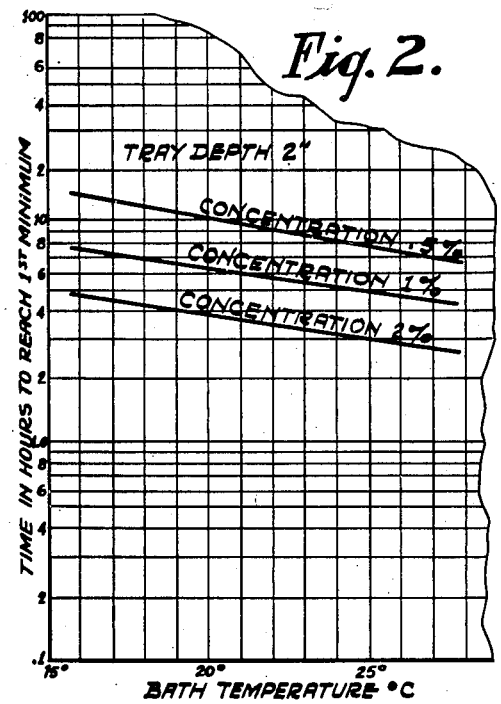
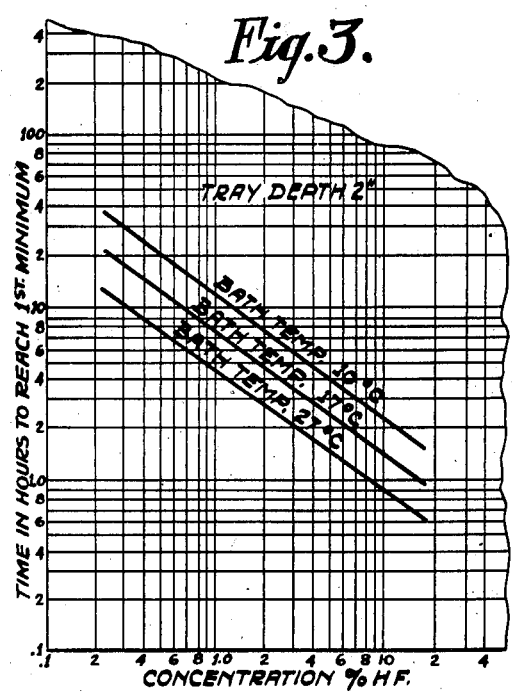
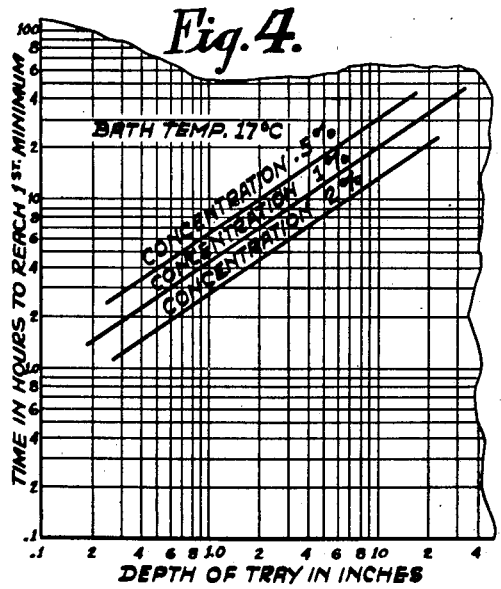
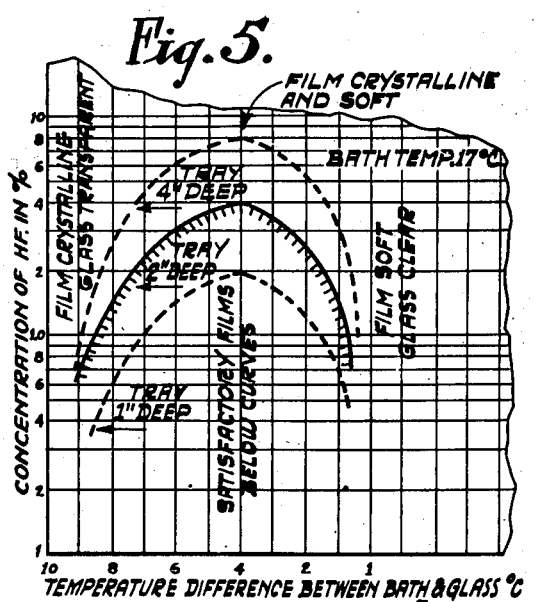
Inventor
Frederick H. Nicoll
By
C O Tuska
Attorney Patented Feb. 15, 1949

2,461,840

UNITED STATES PATENT OFFICE 2,461,840

METHOD OF FORMING LOW-REFLECTING SURFACES ON OPTICAL ELEMENTS

Frederick H. Nicoll, Princeton, N. J., assignor to Radio Corporation of America, a corporation of Delaware Application October 14, 1942, Serial No. 461,958

5 Claims. (Cl. 41—42)

My invention relates to a method of treating the surface of glass to produce a hard, durable, skeletonized, transparent layer having resistance to chemical reaction similar to that of the glass and the thickness and refractive index desired for minimizing reflection and promoting transmission of light, and to low reflection glass produced by such treatment.

This application is a continuation-in-part of my application Serial No. 406,601 filed August 13, 1941, now abandoned.

The optical characteristics required for a film on glass to secure minimum reflection and maximum transmission of light are well known. As to thickness, the film should have an optical thickness of one-quarter of the wave length of the light to be transmitted. In the case of white light, the thickness usually desired is one-quarter of the wave length of the green component, which is approximately 5350 angstroms. In lieu of one-quarter wave length, the thickness may be an odd number of quarter wave lengths, but with loss of efficiency as the odd number increases. Any deviation in the thickness of the film from a quarter wave length, or an odd number of quarter wave lengths, also reduces the efficiency of the film. As to the index of refraction, the film should have a lower index than that of the glass and preferably it should be of the order of the square root of the product of the indices of refraction of the glass and the other medium between which the film is to be used. If the other medium is air, the ideal index of refraction of the film would be approximately the square root of that of the glass. However, useful suppression of reflection may be obtained by imparting to the film a refractive index substantially less than that of the glass, the efficiency increasing as the ideal is approached.

It has not been possible prior to my invention, so far as I am aware, to produce a film having a desirably low index of refraction in combination with hardness, permanence and resistance to chemical attack sufficiently comparable to that of glass to enable the film to withstand most conditions to which glass is normally exposed in use. To obtain a desirably low index of refraction for the film it has heretofore been necessary to resort to coating the glass with softer and less resistant substances, such as stearates or other soaps of fatty acids (Blodgett Patents Nos. 2,220,860 and 2,220,861) or fluorides (Cartwright et al. Patent No. 2,207,656).

Reflection reducing films have also been obtained by leaching certain types of glass, such as lead glass, with aqueous solutions of reagents, such as nitric acid, which will not dissolve silica but are capable of attacking and dissolving certain non-silicious constituents of the glass, insofar as such non-silicious constituents are not blocked off from such attack by silica or silicious reaction products (Ordnance Department Document No. 2037, May 1921, page 76, and Blodgett Patent 2,220,862). Such leaching processes, being dependent on the composition of the particular glass, give irregular results. Moreover, the index of refraction has only been reduced to approximately 1.46, the index of solid silica (fused quartz) (Blodgett articles, The Physical Review for February 15, 1939 and The Review of Scientific Instruments for January 1941). The limited and inadequate reduction of the refractive index that has been obtained by leaching glass with solutions of such reagents, shows that no substantial skeletonization of the film was obtained by such leaching process. The substantial lack of skeletonized structure in such leached films is recognized in the art (Blodgett article, The Physical Review for Feb. 15, 1939, at page 402).

It is known that leaching glass in a hydrofluoric acid solution does not change the character of the surface of the glass to produce a low reflection film, as does leaching lead glass in a nitric acid solution. The reaction of the hydrofluoric acid solution depends upon its concentration and the extent to which it is agitated. Concentrated solutions tend to pit the glass and give it a frosted appearance whereas dilute solutions remove the glass more slowly but substantially uniformly, leaving a polished surface having substantially the same index of refraction as that of the original surface. Agitation also tends to reduce the pitting and produce a more uniform removal of the glass. In an experiment with glass partially immersed in a dilute solution of hydrofluoric acid to further study this known reaction, I discovered that an entirely different reaction was taking place along a very narrow band above and immediately adjacent to the surface of the solution and that at such narrow band the surface produced on the glass by this reaction had low reflection properties. I found that I could produce a similar low reflection surface with substantial uniformity over the entire surface of a piece of glass by treating the glass with vapor obtained from a dilute solution of hydrofluoric acid and controlled as herein explained. I also found that the low reflection surface produced by this vapor reaction may be made to have a thickness of any desired quarter wave length of visible light, and a hardness, durability and resistance to chemical reaction comparable to that of glass itself in combination with a refractive index lower than was previously obtainable except by coating the glass with softer materials.

Broadly stated, my method comprises treating the surface of glass with dilute hydrofluoric acid gas under conditions promoting substantially uniform gas concentration and distribution and preventing condensation of moisture, at the treated surface, until a region extending inwardly from the surface, integral with the glass, skeletonized to the desired extent and having the desired thickness is formed. While this skeletonized region is herein called a layer, it is not to be confused with the physically deposited layer added to the surface of glass by earlier methods.

My process attacks silicious as well as non-silicious constituents of glass, and may be used to skeletonize a region extending inwardly from the surface of any kind of glass having silicious and non-silicious constituents susceptible to attack by hydrofluoric acid. For example, my process has been successfully applied to the treatment of window glass and other lime glasses, to lead glass containing as much as 66% lead, as well as to light and intermediate lead glasses, to borosilicate crown glass containing as much as 70% silica, as well as to such glass of relatively low silica content, and to barium glasses of various types.

A convenient apparatus for carrying out my process and a series of curves showing operating characteristics for such apparatus, are illustrated in the accompanying drawings in which:

Fig. 1 is a sectional view of the apparatus, and

Figs. 2 to 5 inclusive are graphs representing the relation between time, temperature, concentration of solution and other factors when the process is carried out with apparatus similar to that illustrated in Fig. 1.

Before treating the glass it is usually desirable to clean it thoroughly. Finger marks and grease should be removed by washing the glass with a solvent such as alcohol or acetone. The surface of the glass can then be given a thorough cleaning with powdered chalk or one of the equivalent commercial cleaning preparations and the surface thoroughly wiped before the powder dries. The surface should finally be polished with a dry cloth until no marks are visible.

The glass can be treated by means of the "tray apparatus" illustrated in Fig. 1, which comprises a tray-like container 10 lined with paraffin, wax or other similar material 11 for resisting attack by hydrofluoric acid. The tray is partly filled with a dilute aqueous solution of hydrofluoric acid as indicated at 12, this being a convenient way to provide a controllable source of dilute hydrofluoric acid gas for use in the process. The glass to be treated, indicated at 13, is placed across the top of tray 10 whereby its lower surface 14 is attacked by vapor from the solution 12. Other controllable sources of hydrofluoric acid gas may obviously be substituted for such solution. When a dilute aqueous solution of hydrofluoric acid is used as the source of the gas, a 1% solution usually supplies gas of suitable dilution for carrying out the process at ordinary room temperature. Weaker solutions slow the process unnecessarily and stronger solutions, especially solutions exceeding 5%, make it more difficult to avoid undesirable etching of the glass. However, the strength of the solution may be varied as hereinafter indicated, with conditions which affect the concentration of the gas at the surface of the glass, since it is the latter concentration that is of importance in carrying out the process.

Container 10 is placed in a larger container 15 and spaced from the bottom thereof by spacers 16 so that a water bath 17 may be used to control the temperature of the hydrofluoric acid solution 12. When the glass 13 is at room temperature satisfactory results are obtained if the bath temperature is from 5° C. to 7° C. lower than room temperature. If the bath temperature approaches the glass temperature too closely, the hydrofluoric acid vapor condenses on the glass and either damages or removes the low reflection surface.

It is usually desirable to maintain an air-tight contact between the glass and the tray during the treatment so as to avoid non-uniformity in the low reflection surface near the edge of the glass. This can be accomplished by use of sealing tape, sponge rubber strips, soft wax or other similar sealing materials.

The treatment is continued until the treated surface, which can be examined from time to time without removing the glass from the tray, produces a purple interference color which is visible in reflected light. Under this condition maximum transmission of green light occurs and reflection from the treated surface is usually between .2% and .4% of the incident light.

During the treatment a white deposit consisting of fluorides and other products of the chemical reaction, is formed on the treated surface. The deposit should be removed by washing the glass in water as soon as it is removed from the tray. If allowed to remain on the glass, the deposit becomes very hard and causes the treated surface to have a higher index of refraction than if the glass were promptly washed in water.

When my process is carried out by means of the tray method there are certain variables which determine the satisfactory operation of the process. The relation of these variables to each other is shown by the graphs of Figs. 2 to 5.

Fig. 2 shows the time in hours required to treat ordinary crown glass, for different concentrations of the hydrofluoric acid solution and different bath temperatures, to produce the desired low reflection layer. These variables are also dependent upon the "tray depth" (the distance between the lower surface 14 of the glass and the solution 12) and the temperature difference between the bath and the glass. In obtaining the data for Fig. 2, a tray depth of two inches was used and the temperature difference was between 5° C. and 7° C. The ordinates are given in hours required to reach the "1st minimum," i. e., the condition when the skeletonized layer has a thickness, or equivalent optical thickness, equal to one-quarter of the wave length of the desired component of visible light.

The graphs of Fig. 2 show that the time of treatment decreases as the concentration of hydrofluoric acid is increased and also as the bath temperature is increased. Thus the process follows the usual chemical law relating to the increasing rate of chemical reaction with increase in temperature.

Satisfactory operating conditions for carrying out the process can be determined from Fig. 2. For example, with a tray depth of two inches and a hydrofluoric acid solution of 1% concentration, the time of treatment will be just over six hours if the bath temperature is 20° C. and the glass temperature is sufficiently higher to produce a satisfactory low reflection layer in accordance with the graphs shown in Fig. 5. If the glass temperature is from 5° C. to 7° C. higher than the bath temperature, very satisfactory results are obtained. Increasing the bath and glass temperatures while maintaining the desired 5° C. to 7° C. temperature difference, will decrease the time of treatment. If the bath temperature is increased to 25° C., while maintaining the desired temperature difference, the time of treatment is reduced to about five hours. Increasing the concentration also decreases the time of treatment, as shown by the 2% concentration line.

Fig. 3 shows in more detail how the time of treatment varies with variations in the concentration of the hydrofluoric acid solution. The working conditions for Fig. 3 also include a tray depth of two inches and a temperature difference within the range indicated in Fig. 5 and preferably between 5° C. and 7° C. The graph shows that the time of treatment decreases as the concentration of the hydrofluoric acid solution is increased. With a bath temperature of 17° C. and with 1% concentration, the time of treatment is over seven hours. If the concentration is increased to 2% the time is reduced to about four and one-half hours whereas if the concentration is increased to 4% the time is reduced to less than three hours. If the concentration is increased above 4% and the other variables are maintained constant, the time of treatment will be correspondingly decreased but the surface will probably be soft and crystalline as shown by Fig. 5. Fig. 3 also shows that if the bath temperature is increased there is a corresponding decrease in time of treatment.

Fig. 4 shows how the time of treatment varies with the tray depth. As the tray depth is increased the time of treatment is likewise increased. The data for Fig. 4 was obtained with the bath temperature maintained at 17° C. and the glass temperature sufficiently higher to give satisfactory low reflection layers, e. g., to maintain the desired 5° C. to 7° C. temperature difference. With a tray depth of two inches and 1% concentration, the time of treatment is approximately seven hours whereas if the tray depth is reduced to one inch the time of treatment is decreased to about four and one-half hours. If the tray depth is increased to four inches the time of treatment is increased to over ten hours. However, if the concentration is increased at the same time that the tray depth is increased, the time of treatment can be maintained substantially constant.

In treating curved surfaces it is desirable to increase the tray depth and concentration as there is substantially less variation between different areas of the treated curved surface for a tray depth of, say, eight inches than for a tray depth of one inch. Treatment of a watch crystal approximately three inches in diameter and approximately one-quarter inch higher at the center than at the edge, produced a substantially uniform low reflection layer when treated with a tray depth of eight inches and an acid concentration of 4%.

Fig. 5 shows conditions under which satisfactory low reflection layers are obtainable. With a tray depth of two inches satisfactory layers are obtainable for conditions falling within the area under the curve marked "Tray 2" Deep." Thus, with a bath temperature of 17° C. and a concentration of 1%, satisfactory layers are obtainable when the temperature of the glass is from 1½° C. to 8° C. higher than the temperature of the bath, i. e., when the temperature difference is between 1½° C. and 8° C. Layers produced when the temperature difference is approximately 7° C. or 8° C. are somewhat harder than those produced with lower temperature differences and it is therefore frequently desirable to carry out the process with approximately the largest temperature difference, for any given concentration, indicated as satisfactory on the graph. On the other hand, the softer layers usually have lower indices of refraction due, probably, to more extensive skeletonization of the layers. If the temperature difference falls below 1½° C. the surface becomes quite soft as indicated by the legend at the right hand side of the graph. If the temperature of the glass is increased so that the temperature difference is somewhat greater than 8° C., the layer usually becomes crystalline as is indicated by the legend at the left hand side of the graph.

Increasing the concentration from 1% to 2% decreases the operating limits within which satisfactory low reflection layers are obtainable. At 2% concentration satisfactory layers are obtainable if the temperature difference between the bath and glass, is between 2° C. and 7° C. Under these conditions the layer is harder if this temperature difference is approximately 6° C. or 7° C. If the concentration is increased to 3% satisfactory layers are obtainable for temperature differences between 3° C. and 6° C. whereas if the concentration is increased to 4% satisfactory layers are obtainable when the temperature difference is 4° C. If the concentration is increased above 4%, the layer tends to become soft and crystalline as is indicated by the legend appearing at the top of the graph.

Similarly, the conditions under which suitable low reflecting layers can be obtained for tray depths of one inch and of four inches can be determined from the curves labeled "Tray 1" Deep" and "Tray 4" Deep."

The tendency to form a crystalline pattern resulting from too great a temperature difference between the glass and the bath, is decreased by removing the glass from the tray from time to time and washing it with water. By this means the temperature may be increased a few degrees and the time of treatment correspondingly decreased. This procedure has the disadvantage, however, that the final result is determined largely by inspection as the interruption of the treatment and the consequent variations in temperature preclude treatment controlled as a function of time and temperature.

After the glass has been treated it can be cleaned in any manner in which ordinary glass is cleaned except that the use of abrasives should be avoided. The skeletonized layer can, for instance, be cleaned with liquid window cleaners or with a solvent for the specific foreign material on the glass. Soap and water is a very effective cleaner. In fact, most acids and alkalies which would not attack the glass itself, have no deleterious effect on the skeletonized layer.

Chemical analysis of scrapings of the low reflection layer produced by my process indicate that it is composed largely of silica, although other ingredients, including fluoride reaction products may also be present. There are also other indications that the low reflection layer is largely of silicious nature such as the fact that it is not appreciably attacked by many reagents which readily attack calcium fluoride and other fluorides, as well as the non-silicious ingredients of the glass. Among such reagents are ammonium carbonate solutions, dilute and concentrated $H_2SO_4$, cold dilute $HNO_3$, cold NAOH, concentrated HCl and chromic acid either cold or boiling.

Calculations from reflection measurements obtained from one sample of treated glass show that the low reflection layer of that sample has an index of refraction in the neighborhood of 1.28 as compared with 1.46, the index of refraction of solid silica. The indices of refraction of other low reflection layers produced by my process are likewise appreciably less than 1.46 although the index of refraction of any particular layer may differ from that of another layer depending upon the nature of the glass on which it is formed and other factors such as the temperatures at which the process was carried out and the concentration of the hydrofluoric acid solution. From these facts it is concluded that the low reflection layer is porous rather than a film of solid silica, and that the reduction in the index or refraction to a value appreciably less than the refractive index of solid silica results from the reduction in the density of the glass (or silica) by the formation of the skeletonized or coral-like structure which constitutes the low reflection layer. An index of refraction of 1.28 for a material composed largely of silica, corresponds to the refractive index of a structure having a solid content of the order of 65% and minute air-filled voids of the order of 35%.

Another indication that the low reflection layer produced by my process has a skeletonized structure, is the fact that light oil applied to it is absorbed into its structure in such a manner that the oil cannot be removed by wiping the treated surface with a dry cloth. It is necessary to wash the glass with soap and water or to use some other solvent to remove the oil. Finger prints cannot be wiped from the treated surface but must be washed off with soap and water or removed with some other solvent.

Electron microphotographs of scrapings of the low reflection layer also indicate that it has a skeletonized or coral-like structure. It is estimated from these microphotographs that the voids in the skeletonized structure have transverse dimensions in the neighborhood of one-fortieth of the wave length of green light and that the distances between voids, measured through the solid portions of the skeletonized structure, are likewise substantially smaller than a wave length of visible light.

I claim:

1. The method of treating glass to reduce the reflection of a component of light therefrom which comprises the steps of exposing a surface of said glass to the action of vapor arising from a dilute aqueous solution of hydrofluoric acid, maintaining the temperature of said solution lower than that of said surface to prevent condensation, whereby to reduce the density of a layer of said glass immediately adjacent said surface, and continuing said exposure until said layer has an effective optical thickness of the order of an odd integral number of quarter-wavelengths of said component of light and an index of refraction of the order of the square root of the index of refraction of said glass.

2. A method according to claim 1 wherein said surface is maintained free from condensation by maintaining said solution at a temperature of between 16° C. to 27° C. and said surface is maintained at a temperature of from 5° C. to 7° C. higher than that of said solution.

3. The method of reducing the index of refraction of a region of uniform depth extending inwardly from a surface of glass which includes the step of subjecting a surface of said glass to hydrofluoric acid vapor equal to that existing at a point two inches above an aqueous solution of hydrofluoric acid of one percent concentration under conditions inhibiting condensation of said vapor on said glass by maintaining said gas at a lower temperature than said glass to skeletonize the surface of said glass by removing silicious and non-silicious components of said glass until a porous structure consisting substantially of silica remains, but having an index of refraction substantially lower than that of solid silica, and an optical thickness equal to an odd number of quarter wavelengths of a component of visible light.

4. The method of treating a glass surface to reduce the reflection therefrom of light of a given wavelength which consists in altering said surface with an aqueous vapor containing hydrofluoric acid gas equal to that at a point two inches above an aqueous solution of hydrofluoric acid of one percent concentration, maintaining the vapor sufficiently cooler than the glass to prevent condensation of the vapor upon the surface to be treated, maintaining the vapor at a uniform concentration adjacent the treated surface to produce a skeletonized layer having a lower index of refraction than that of the untreated glass, and continuing such treatment until such layer has an effective optical thickness equal to an odd number of quarter wavelengths of said light.

5. The method of treating glass which includes the steps of subjecting a surface of the glass to an aqueous hydrofluoric acid vapor having a concentration of water vapor equal to that at a point two inches above an aqueous solution of hydrofluoric acid of one percent concentration, maintaining the temperature of the glass at approximately 23° C. and the temperature of the solution from 5° to 7° lower, and continuing such treatment until a low reflectance surface layer is formed having a thickness equal to an odd number of quarter wavelengths of a component of visible light.

FREDERICK H. NICOLL.

REFERENCES CITED

The following references are of record in the file of this patent:

UNITED STATES PATENTS

| Number | Name | Date |
|---|---|---|
| 152,059 | Archer | June 16, 1874 |
| 230,137 | Lapham | July 20, 1880 |
| 276,894 | Berge | May 1, 1883 |
| 1,240,398 | Wood | Sept. 18, 1917 |
| 1,980,021 | Wetherbee | Nov. 6, 1934 |
| 2,137,683 | Flaherty | Nov. 22, 1938 |

(Other references on following page)

UNITED STATES PATENTS

| Number | Name | Date |
|---|---|---|
| 2,202,327 | Yunck | May 28, 1940 |
| 2,207,656 | Cartwright et al. | July 9, 1940 |
| 2,215,039 | Hood | Sept. 17, 1940 |
| 2,220,862 | Blodgett | Nov. 5, 1940 |
| 2,282,677 | Rayton | May 12, 1942 |
| 2,348,704 | Adams | May 16, 1944 |
| 2,356,553 | Weissenberg | Aug. 22, 1944 |
| 2,364,501 | Wolfskill | Dec. 5, 1944 |

FOREIGN PATENTS

| Number | Country | Date |
|---|---|---|
| 29,561 | Great Britain | 1904 |

OTHER REFERENCES

Pottery and Glassware, Dec. 1, 1887, Etching on Glass.

Jones et al. J.O.S.A., vol. 31, Jan. 1941, pp. 34-37.

Blodgett, Physical Review, vol. 55, Feb. 15, 1939, pp. 402, 403.

Deve: Text Optical Workshop Principles, 1942-1943, Translated from French edition (1936) by Trippel, pages 279-281, Supplied by Jarrell-Ash Co., 165 Newbury Street, Boston, Mass.